(12) United States Patent
Buie

(10) Patent No.: US 7,665,756 B2
(45) Date of Patent: Feb. 23, 2010

(54) COUNTERWEIGHTED GATE

(75) Inventor: Brandon Lee Buie, Evansville, IN (US)

(73) Assignee: Toyota Motor Engineering and Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 11/536,764

(22) Filed: Sep. 29, 2006

(65) Prior Publication Data

US 2008/0079229 A1    Apr. 3, 2008

(51) Int. Cl.
*B62B 1/00* (2006.01)
(52) U.S. Cl. .................. 280/656; 280/415.1; 280/47.24
(58) Field of Classification Search ................. 280/656, 280/415.1, 482, 491.1, 769, 651, 639, 47.24, 280/47.28, 47.29, 47.26; 224/511, 526; 414/537, 414/402, 521, 279; 296/160, 169
See application file for complete search history.

(56) References Cited

U.S. PATENT DOCUMENTS

| | | | |
|---|---|---|---|
| 2,229,244 A | 1/1941 | Husted | |
| 2,367,754 A | 1/1945 | Cole | |
| 2,408,284 A | 9/1946 | Anthony | |
| 2,795,363 A * | 6/1957 | Turner | 224/526 |
| 3,025,985 A * | 3/1962 | Crawford | 414/537 |
| 3,032,212 A | 5/1962 | Gaskin et al. | |
| 3,212,655 A | 10/1965 | Pruss | |
| 3,572,742 A | 3/1971 | Marker | |
| 4,050,587 A | 9/1977 | Moen | |
| 4,596,347 A * | 6/1986 | Hite | 224/410 |
| 5,178,320 A * | 1/1993 | Bertone | 232/17 |
| 5,209,628 A | 5/1993 | Hassell | |
| 5,267,748 A * | 12/1993 | Curran | 280/415.1 |
| 5,582,501 A | 12/1996 | Meyer | |
| 5,769,449 A * | 6/1998 | Keesee | 280/656 |
| 5,885,048 A | 3/1999 | Barth | |
| 5,988,597 A * | 11/1999 | Egan | 414/426 |
| 6,082,956 A | 7/2000 | Pentland | |
| 6,357,986 B1 | 3/2002 | Sonnamaker et al. | |
| 6,378,748 B1 * | 4/2002 | Cox | 224/511 |
| 6,557,882 B2 * | 5/2003 | Harrington | 280/415.1 |
| 6,659,497 B1 * | 12/2003 | Owens | 280/656 |
| 6,733,026 B1 * | 5/2004 | Robberson et al. | 280/415.1 |
| 6,846,003 B2 * | 1/2005 | Thompson | 280/656 |
| 6,962,370 B2 * | 11/2005 | Simpson | 280/789 |
| 7,052,033 B2 * | 5/2006 | McDonell | 280/656 |
| 7,165,779 B2 * | 1/2007 | Badger et al. | 280/656 |
| 7,188,857 B2 * | 3/2007 | Richard et al. | 280/482 |

(Continued)

*Primary Examiner*—Hau V Phan
(74) *Attorney, Agent, or Firm*—Dinsmore & Shohl LLP

(57) ABSTRACT

Dollies and methods of using dollies can include a platform configured to hold items for transport, a support frame adjacent the platform, an actuation mechanism coupled to the support frame, and a moveable gate coupled to the support frame and configured to be moved from a closed position to an open position in response to the triggering of the actuation mechanism by force applied by a user. The moveable gate can comprise a rotatable shaft disposed at an end of the moveable gate and extending within an opening, wherein the moveable gate is configured to move with the rotatable shaft as the shaft rotates within the opening, and at least one counterweight coupled to the moveable gate and positioned to assist in the movement of the gate to the open position in response to the triggering of the actuation mechanism.

20 Claims, 3 Drawing Sheets

U.S. PATENT DOCUMENTS

| | | |
|---|---|---|
| 2005/0093273 A1* | 5/2005 | McDonell .................. 280/656 |
| 2005/0118011 A1 | 6/2005 | Krawczyk |
| 2007/0132209 A1* | 6/2007 | Winter et al. ............... 280/656 |
| 2007/0145718 A1* | 6/2007 | Winter et al. ............ 280/491.1 |

* cited by examiner

COUNTERWEIGHTED GATE

TECHNICAL FIELD

The present invention is generally directed to transport dollies, and embodiments are specifically directed to a counterweighted gate on a dolly used to minimize the force required by the user in raising and lowering the dolly gate.

BACKGROUND

Transport vehicles, or dollies, are used to transport items of various weights and sizes. Dollies are especially prevalent in manufacturing and distribution facilities in which the unloading and unloading of items is commonplace. Dollies may be tailored and customized based on the characteristics of the items to be transported. For example, the dolly may be configured to carefully secure fragile items on the dolly platform. Dollies may also be customized to align with loading and unloading devices, such as conveyors. One such dolly component, which secures the items on the dolly as well as easing the loading and unloading of items, is the dolly gate. The dolly gate is coupled to the dolly, and can be used to prevent items from sliding off of the dolly. Furthermore, the dolly gate may comprise a frame having dimensions that facilitate aligning with a conveyor such that items may be delivered directly from the conveyor to the dolly.

These benefits notwithstanding, conventional dolly gates are heavy steel components requiring significant exertions of force, for example, at least 20 pounds of force to move the device from open and closed positions. As a result, the need arises for improvements in dollies and dolly gates, which facilitate easier use and control of the dolly gates.

SUMMARY

According to one embodiment of the present invention, a dolly is provided. The dolly comprises a platform configured to hold items for transport, a support frame adjacent the platform, and an actuation mechanism coupled to the support frame. The dolly further comprises a moveable gate coupled to the support frame and configured to be moved from a closed position to an open position in response to the triggering of the actuation mechanism by force applied by a user. The moveable gate comprises a rotatable shaft disposed at an end of the moveable gate and extending within an opening, wherein the moveable gate is configured to move with the rotatable shaft as the shaft rotates within the opening. The moveable gate also comprises at least one counterweight coupled to the moveable gate and positioned to assist in the movement of the gate to the open position in response to the triggering of the actuation mechanism.

According to another embodiment of the present invention, a dolly is provided. The dolly comprises a platform configured to hold items for transport, a support frame adjacent the platform, an actuation mechanism coupled to the support frame, a pair of pillow block bearings mounted on the support frame and spaced a set distance apart. The dolly further comprises a moveable gate coupled to the support frame and configured to be moved from a closed position to an open position in response to the triggering of the actuation mechanism by force applied by a user. The moveable gate comprises a rotatable shaft disposed at an end of the moveable gate and extending within an opening of the pillow block bearings, wherein the moveable gate is configured to move with the rotatable shaft as the shaft rotates within the opening of the pillow block bearings. The moveable gate also comprises at least one counterweight coupled to the moveable gate and positioned to assist in the movement of the gate to the open position in response to the triggering of the actuation mechanism.

According to yet another embodiment of the present invention, a method of using a dolly gate is provided. The method comprises providing a dolly comprising a platform, a support frame, an actuation mechanism coupled to the support frame, and a moveable gate responsive to the actuation mechanism, and also providing a counterweight to an end of the moveable gate, wherein the counterweight is configured to reduce the force required to trigger the actuation mechanism. The method further comprises moving the moveable gate to a closed position under assistance of the counterweight by exerting less than about 5 pounds of force on the actuation mechanism.

Additional features and advantages provided by the dollies and moveable gates of the embodiments of the present inventions will be more fully understood in view of the following detailed description, in conjunction with the drawings.

BRIEF DESCRIPTION OF THE DRAWINGS

The following detailed description of the illustrative embodiments can be best understood when read in conjunction with the following drawings, where like structure is indicated with like reference numerals and in which.

DETAILED DESCRIPTION OF THE ILLUSTRATIVE EMBODIMENTS

Figure 1:
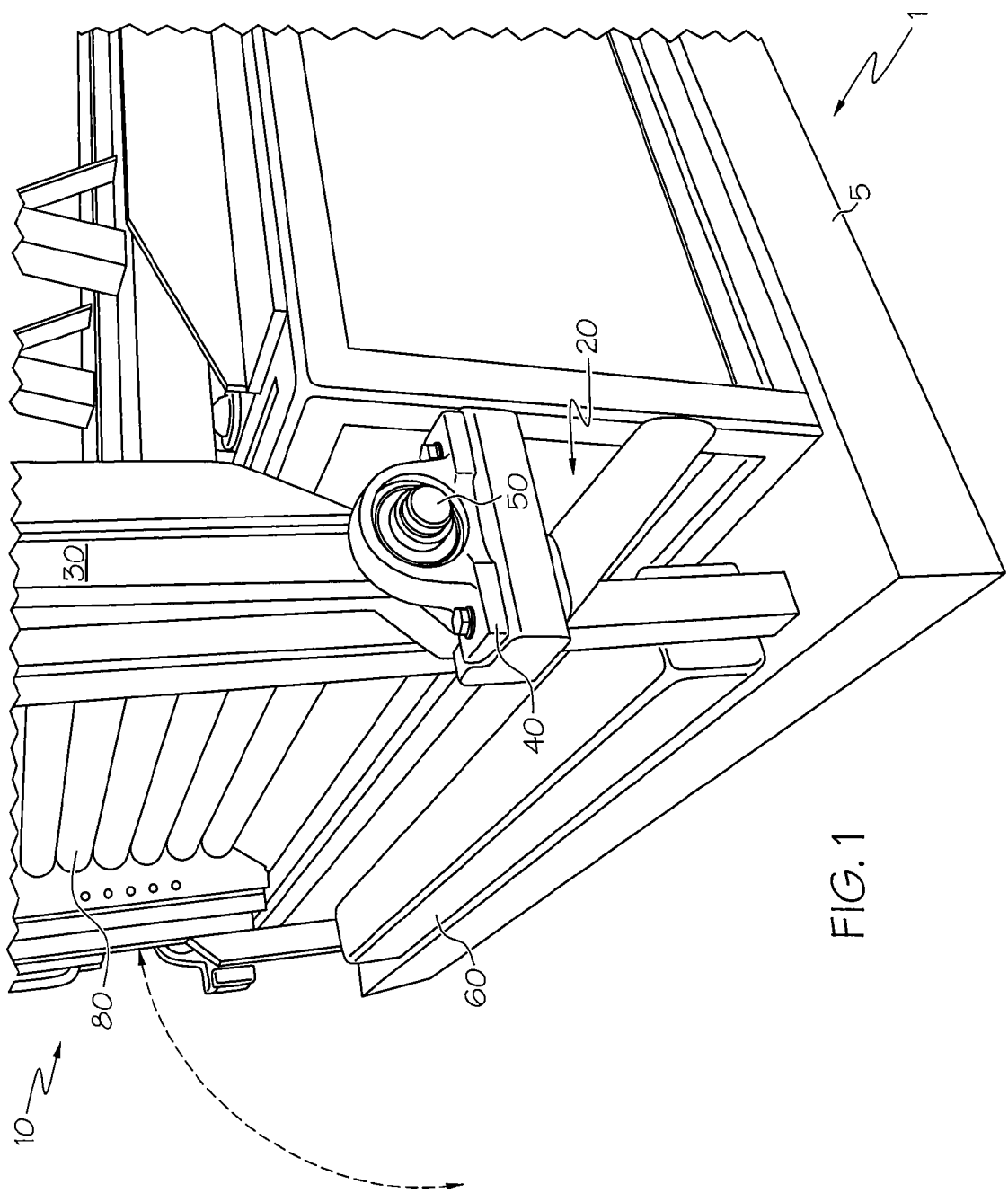
FIG. 1 is an illustration showing a side view of a dolly comprising a counterweighted gate in a closed position according to one or more embodiments of the present invention.
Figure 2:
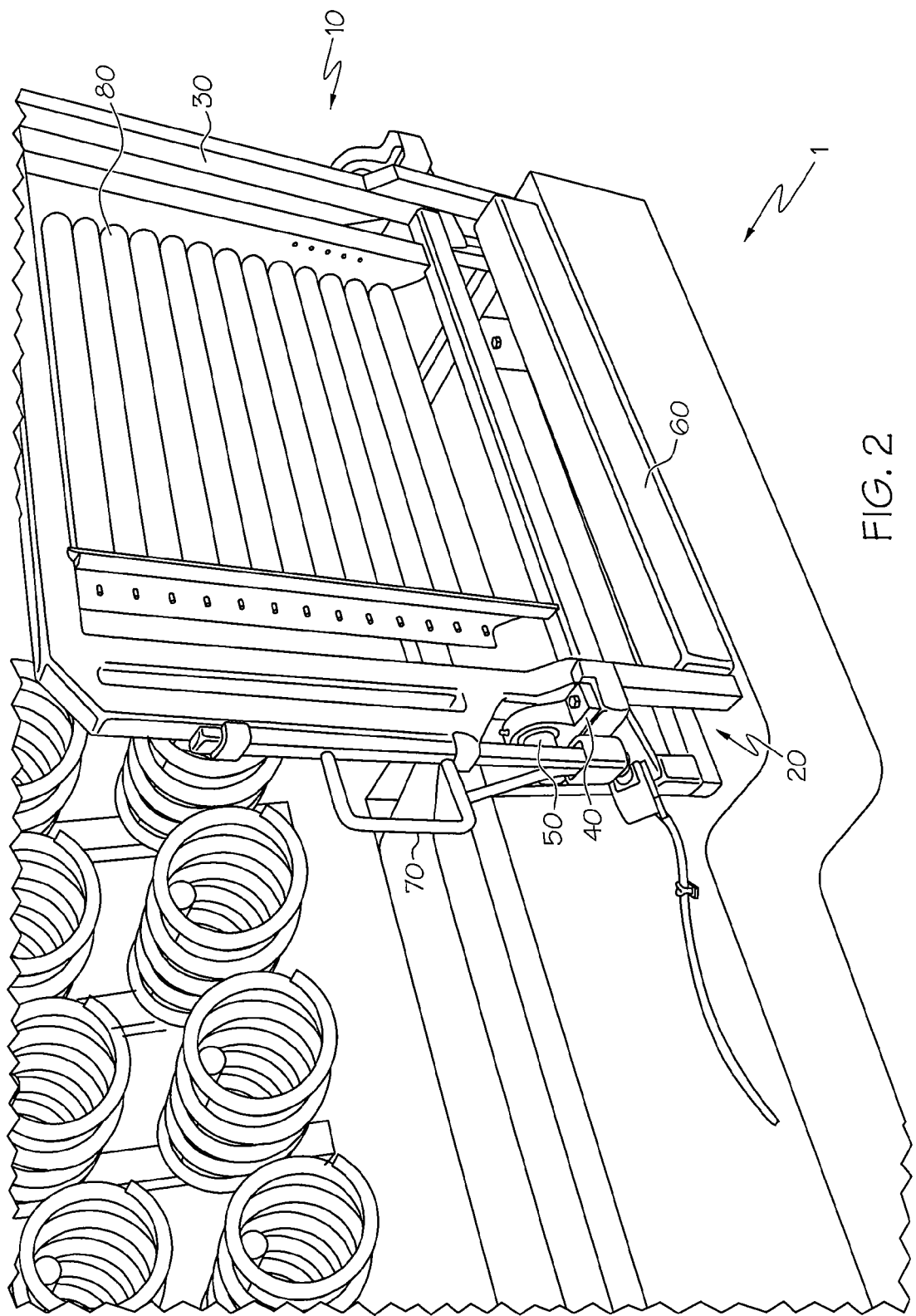
FIG. 2 is another illustration showing an opposite side view of the dolly comprising a counterweighted gate in a closed position according to one or more embodiments of the present invention.
Figure 3:
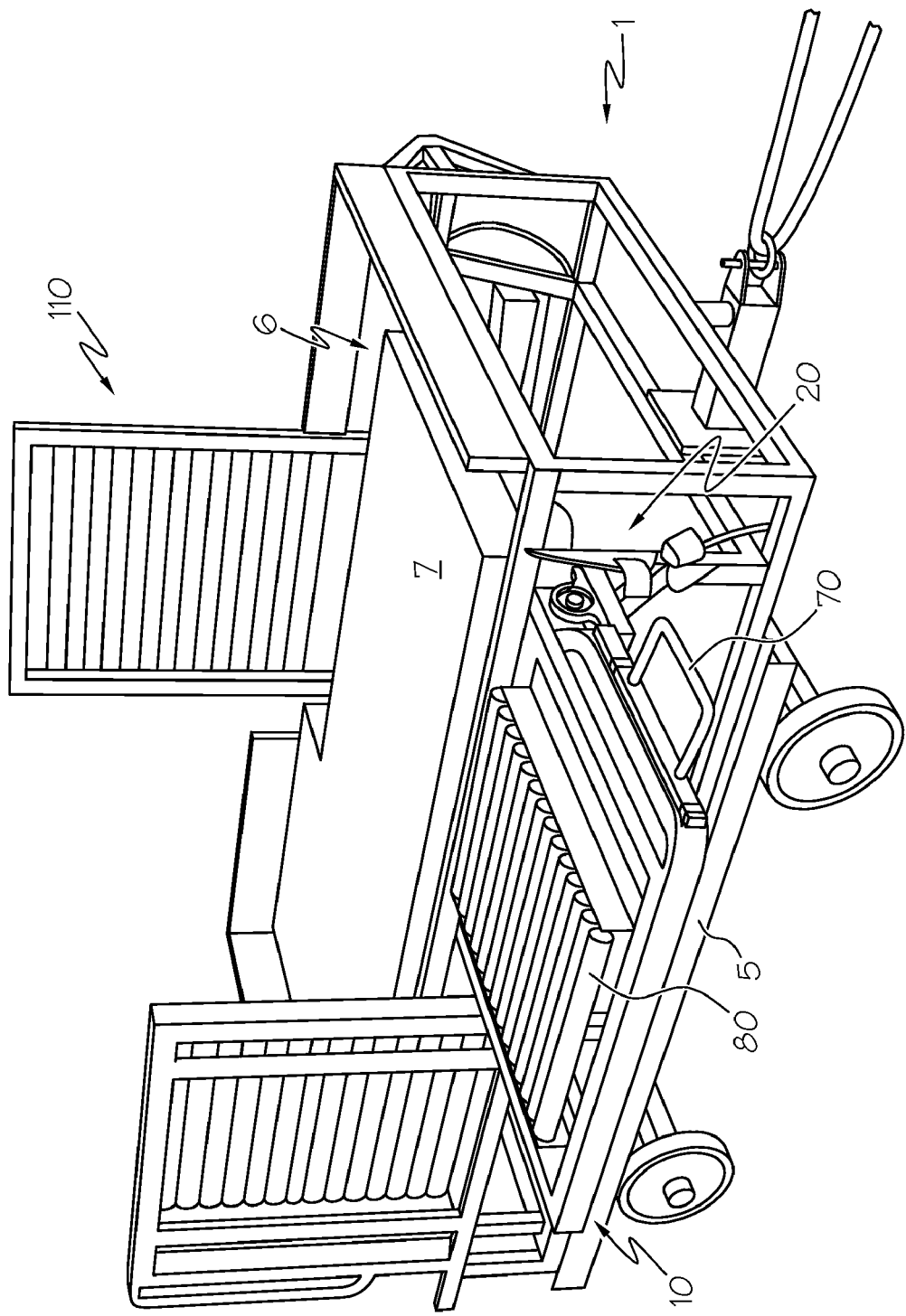
FIG. 3 is an illustration of a dolly comprising a counterweighted gate in an open position according to one or more embodiments of the present invention.

Referring to the embodiments of FIGS. 1-3, a dolly 1 is provided. The dolly 1 may comprise any suitable dolly transport device known to one of ordinary skill in the art. The dolly 1 may comprise manual components, hydraulic components, electrical components, or combinations thereof. For portability, the dolly may comprise a plurality of wheels as shown in FIG. 3. The dolly 1 comprises a platform 5 configured to hold items for transport, and a support frame 20 adjacent the platform 5. The platform 5 is configured to hold items of various sizes and weights as desired by the user. For example, and not by way of limitation, the platform may comprise a plurality of coil springs as shown in FIG. 2. The dolly 1 also comprises an actuation mechanism 70 coupled to the support frame 20, and a moveable gate 10 coupled to the support frame 20. The support frame 20 is configured to couple the moveable gate 10 to the platform 5. As shown in the embodiments of FIGS. 1 and 2, the support frame 20 extends upward from the platform 5. The support frame 20 comprises a height sufficient to allow the gate 10 to swing upward and downward. In one exemplary embodiment, the moveable gate 10 is mounted to the support frame 20 via screws, bolts, etc. The actuation mechanism 70 may, in some embodiments, be mounted to the support frame 20; however, it is further contemplated that the support frame 20 may be coupled to the moveable gate 10 as well.

The moveable gate 10 may be moved from a closed position to an open position, and vice versa in response to the triggering of the actuation mechanism 70. The actuation mechanism 70 comprises any suitable device operable to move the moveable gate 10 when the user triggers the actuation mechanism 70 by exerting a force on the actuation mechanism. In a few exemplary embodiments, the actuation mechanism 70 comprises a button, a switch, a lever, a handle, or combinations thereof. Referring to FIG. 2, the actuation mechanism 70 may be directly connected to the dolly 1, for example, by a handle mounted thereon, or in a further embodiment, the actuation mechanism 70 may be connected remotely or wirelessly to the dolly 1 through a remote control device. The moveable gate 10 may also a locking device (not shown) configured to secure the gate in an open or closed position, and configured to be disengaged when the gate is moved to an open or closed position. The locking device may comprise a locking pin or some other suitable locking component known to one of ordinary skill in the art. In one exemplary embodiment, triggering the actuation mechanism disengages the locking device so the gate may be moved.

The moveable gate 10 may also comprise various configurations known to one of ordinary skill in the art. Referring to the embodiments of FIGS. 1 and 2, the moveable gate 10 comprises a rectangular frame 30. The dimensions of the rectangular frame 30 may vary based on numerous factors, for example, the size of the dolly frame, the size of items transported. In one exemplary embodiment, the rectangular frame comprises a length of about 24 to about 30 inches. The width of the gate 10 varies based on a variety of factors. For instance, when the gate couples with a conveyor (not shown) to deliver items from the platform 5 to the conveyor, it is important that the width of the gate 10 is configured to ensure proper alignment of the gate 10 with the conveyor. In yet another exemplary embodiment, the moveable gate 10 may comprise a gate arm or any other suitable shape and configuration. The moveable gate 10 may comprise any durable material familiar to one of ordinary skill in the art, for example, metals, metal alloys, rigid polymeric materials, or combinations thereof. In one exemplary embodiment, the components of the moveable gate 10 comprise steel.

The moveable gate 10 component comprises a rotatable shaft 50 disposed at an end of the moveable gate 10 and extending within an opening, wherein the moveable gate 10 is configured to move with the rotatable shaft 50 as the shaft 50 rotates within the opening. Depending on the needs of the user, the shaft 50 may comprise various dimensions and shapes. In the embodiment of FIGS. 1 and 2, the rotatable shaft defines a cylindrical tube shape. In one exemplary embodiment, the dolly 1 may comprise pillow block bearings 40, which, as shown in FIG. 1, are mounted to the support frame 20. The pillow block bearings 40 comprise openings for engaging the correspondingly-sized rotatable shaft 50 to allow the shaft 50 rotate within the opening. The moveable gate frame 30 is operable to move in multiple directions, for example, the gate may swing upward, downward, inward, outward, or combinations thereof. The main gate also comprises rollers 80. When the gate is lowered into an open position, the rollers 80 enable items to slide from a loading mechanism, such as a conveyor, onto the dolly 1. The rollers 80 also enable items to move from a dolly 1 to the conveyor.

The moveable gate 10 also comprises at least one counterweight 60 coupled to the moveable gate 10 and positioned to assist in the movement of the gate to the open position in response to the triggering of the actuation mechanism 70. In operation, the counterweight 60 balances the weight of the gate 10, which minimizes the force required in trigger the actuation mechanism thereby reducing the force required in moving the gate. Consequently, the moveable gate 10 is operable to be moved with minimal exertion on behalf of the user. In a couple exemplary embodiments, the moveable gate 10 may be moved to a closed or open position under assistance of the counterweight by exerting less than about 5 pounds, or less than about 1 pounds of force on the actuation mechanism.

In one embodiment as shown in FIGS. 1 and 2, the counterweight 60 is disposed at the same end of the moveable gate 10 as the rotatable shaft 50. The counterweight 60 may comprise various shapes and dimensions known to one of ordinary skill in the art. Referring to the embodiments of FIGS. 1 and 2, the counterweight 60 comprises a square tube shape, which in one exemplary embodiment comprises dimensions of about 3×3×¼ inches. The counterweight 60 is located below the shaft 50 in this example and therefore rotates on an opposite side of the pivot point of the shaft as compared to the main portion of the gate. The weight of the counterweight 60 varies depending on the size of the moveable gate 10. When using a larger gate or heavier materials in the gate, heavier counterweights 60 can be used to balance the moveable gate 10. For example, the counterweight 60 can comprise a weight having about 25 to 100 percent the weight of the portion of the gate on the opposite side of the pivot point of the shaft 50. In a few exemplary embodiments, the counterweight 60 comprises a weight of about 25 to about 50 pounds.

In one exemplary embodiment, the user moves the gate by first contacting the actuation mechanism 70 e.g. by lifting a handle with minimal exertion on behalf of the user. This actuation mechanism 70 disengages the locking device on the gate 10, and causes the gate 10 to rotate upwardly or downwardly. During rotation, the shaft 50, which is coupled to the gate 10, also rotates. The ends of the shaft 50 are engaged inside openings of a pair of pillow block bearings 40, such that the shaft 50 rotates within the pillow block bearings 40. When rotating to an open position, the gate 10 rotates until resting on a receiving surface, such as a conveyor. Items may be transferred from a dolly to the conveyor and vice versa by sliding the items along the rollers 80 of the gate 10

The counterweight 60, which is disposed on the top portion of the gate, assists in the movement of the gate 10 by balancing the weight of the gate 10. When in motion, the top portion of the gate 10 has the greatest moment or rotational force, because it is the furthest distance from the pivot point i.e. the shaft 50 rotating through the pillow block bearing 40. By configuring the counterweight 60 at the bottom portion of the gate 10 on the opposite side of the pivot point, the counterweight 60 is operable to offset this rotational force and balance the gate 10, thereby enabling the user to move the gate with minimal exertion Referring to another embodiment as shown in FIG. 3, the dolly 1 may comprise a storage member 6 disposed on the support frame above the platform 5. The storage member 6 may include a working surface 7, which is suitable to receive items from the first moveable gate 10. As shown, the dolly 1 may comprise a first moveable gate 10, which, when in the open position, may be used to load items onto the working surface 7, or receive items from the working surface 7 during unloading of the working surface 7. Moreover as shown in the FIG. 3 embodiment, the dolly 1 may comprise a second moveable gate 110 coupled to the support frame at a position opposite the first moveable gate 10 and operable to be moved from a closed position to an open position. The second moveable gate 110, when in the open position, may be used to load items onto the working surface 7, or receive items from the working surface 7 during unloading of the working surface 7.

Moreover, as shown in FIG. 3, when the first moveable gate 10 is in the open position and the second moveable gate 110 is also in the open position, the first moveable gate 10 and the second moveable gate 110 are aligned such that objects are transferable from the first moveable gate 10 to the working surface 7 and are then transferable from the working surface 7 to the second moveable gate 110. Consequently, the dolly 1 may be disposed between and may be used to couple two different conveyors or loading/unloading surfaces.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the terms "substantially" and "about" are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention, and the various aspects need not be utilized in combination.

What is claimed is:

1. A dolly comprising:
   a platform;
   a support frame disposed on the platform;
   a storage member disposed on the support frame above the platform and having a working surface;
   a first moveable gate coupled to the support frame above the platform and configured to be moved from a closed position to an open position; wherein the first moveable gate comprises at least one counterweight, and rollers operable to assist in loading or unloading of the dolly; and
   a second moveable gate coupled to the support frame at a position opposite the first moveable gate and configured to be moved from a closed position to an open position, wherein when the first moveable gate is in the open position and the second moveable gate is in the open position, the first and second moveable gates are aligned such that objects are transferable from the first moveable gate to the working surface and are further transferable from the working surface to the second moveable gate.

2. A dolly according to claim 1 wherein the first moveable gate, the second moveable gate, or both comprise a rectangular frame.

3. A dolly according to claim 1 wherein the first moveable gate, the second moveable gate, or both comprise a locking device configured to secure the first moveable gate, the second moveable gate, or both in an open, closed, or intermediate position.

4. A dolly according to claim 1 further comprising a handle configured to allow a user to move the dolly upon actuation of the handle.

5. A dolly according to claim 1 wherein the dolly is manual, hydraulic, electrical, or combinations thereof.

6. A dolly according to claim 1 wherein the moveable gate comprises metals, metal alloys, rigid polymeric materials, or combinations thereof.

7. A dolly according to claim 1 wherein the first moveable gate, the second moveable gate, or both are configured to couple with a conveyor.

8. The dolly of claim 1 wherein the first moveable gate, the second moveable gate, or both comprise a rotatable shaft disposed at an end of the first moveable gate, the second moveable gate, or both.

9. A dolly according to claim 8 wherein the rotatable shaft defines a cylindrical tube.

10. The dolly of claim 8 wherein the counterweight is coupled to the first moveable gate and disposed at the same end of the first moveable gate as the rotatable shaft.

11. The dolly of claim 1 further comprising an actuation mechanism coupled to the dolly.

12. A dolly according to claim 11 wherein the actuation mechanism is a button, a switch, a lever, a handle, or combinations thereof.

13. The dolly of claim 1 wherein the second moveable gate comprises rollers and at least one counterweight.

14. A method of using a dolly gate comprising:
    providing a dolly comprising:
      a platform,
      a support frame disposed on the platform,
      a storage member disposed on the support frame above the platform and having a working surface;
      a first moveable gate coupled to the support frame above the platform and comprising at least one counterweight and rollers, and
      a second moveable gate coupled to the support frame opposite the first moveable gate,
    transferring objects from the first moveable gate to the working surface of the storage member when the first moveable gate is in an open position, or transferring objects from the working surface to the second moveable gate when the second moveable gate is in an open position.

15. A method according to claim 14 further comprising coupling the first moveable gate, the second moveable gate, or both with a conveyor.

16. The method of claim 14 wherein the first moveable gate, the second moveable gate, or both comprise a rotatable shaft disposed at an end of the first moveable gate, the second moveable gate, or both.

17. The method of claim 14 wherein the counterweight is coupled to the first moveable gate and disposed at the same end of the first moveable gate as the rotatable shaft.

18. The method of claim 14 further comprising an actuation mechanism coupled to the dolly.

19. The method of claim 14 wherein the second moveable gate comprises rollers and at least one counterweight.

20. The method of claim 14 wherein the first moveable gate, the second moveable gate, or both comprise comprises a locking device configured to secure the first moveable gate, the second moveable gate, or both in an open, closed, or intermediate position.

* * * * *